(12) United States Patent
Kempter

(10) Patent No.: US 10,737,334 B2
(45) Date of Patent: Aug. 11, 2020

(54) CHUCKING MEANS

(71) Applicant: RÖHM GmbH, Sontheim (DE)

(72) Inventor: Stefan Kempter, Landensberg (DE)

(73) Assignee: RÖHM GmbH, Sontheim (DE)

( * ) Notice: Subject to any disclaimer, the term of this patent is extended or adjusted under 35 U.S.C. 154(b) by 0 days.

(21) Appl. No.: 16/060,928

(22) PCT Filed: Nov. 21, 2016

(86) PCT No.: PCT/EP2016/078235
§ 371 (c)(1),
(2) Date: Jun. 9, 2018

(87) PCT Pub. No.: WO2017/097565
PCT Pub. Date: Jun. 15, 2017

(65) Prior Publication Data
US 2018/0369929 A1    Dec. 27, 2018

(30) Foreign Application Priority Data
Dec. 9, 2015 (DE) .......................... 10 2015 121 391

(51) Int. Cl.
*B23B 31/16* (2006.01)
*B23Q 3/12* (2006.01)
*B23B 31/171* (2006.01)

(52) U.S. Cl.
CPC ........ *B23B 31/16129* (2013.01); *B23B 31/16* (2013.01); *B23B 31/1615* (2013.01);
(Continued)

(58) Field of Classification Search
CPC .............. B23B 31/16; B23B 31/16083; B23B 31/16129; B23B 31/1615;
(Continued)

(56) References Cited

U.S. PATENT DOCUMENTS 1,377,351 A * 5/1921 Hoyle ............... B23B 31/16129
279/72
1,838,714 A * 12/1931 Stevens ............. B23B 31/16004
279/116
(Continued)

FOREIGN PATENT DOCUMENTS

DE          724892 C  *  9/1942  ............... B23Q 3/12
DE       4114885 A1  * 11/1992  ............... B23Q 3/12
(Continued)

*Primary Examiner* — Eric A. Gates
(74) *Attorney, Agent, or Firm* — Damian Wasserbauer, Esq.; Wasserbauer Law LLC

(57) ABSTRACT

A chuck apparatus for the fastening to a working spindle (2) of a tool machine, with a chuck body (8) comprising a receptacle (7) for the working spindle (2), with at least two chuck jaws (9) which can be adjusted radially to the body axis, and with a drive ring (10), for whose rotation taking place in the circumferential direction a drive (11) is provided, comprising a structure is formed on the drive ring (10) on its outer circumference or its inner circumference for each chuck jaw (9) and which serves for its adjusting. The invention furthermore relates to a rapid replacement system (1) with the chuck apparatus (3) as a base flange (4) and with a replacement flange (5).

17 Claims, 17 Drawing Sheets

Figure 1:
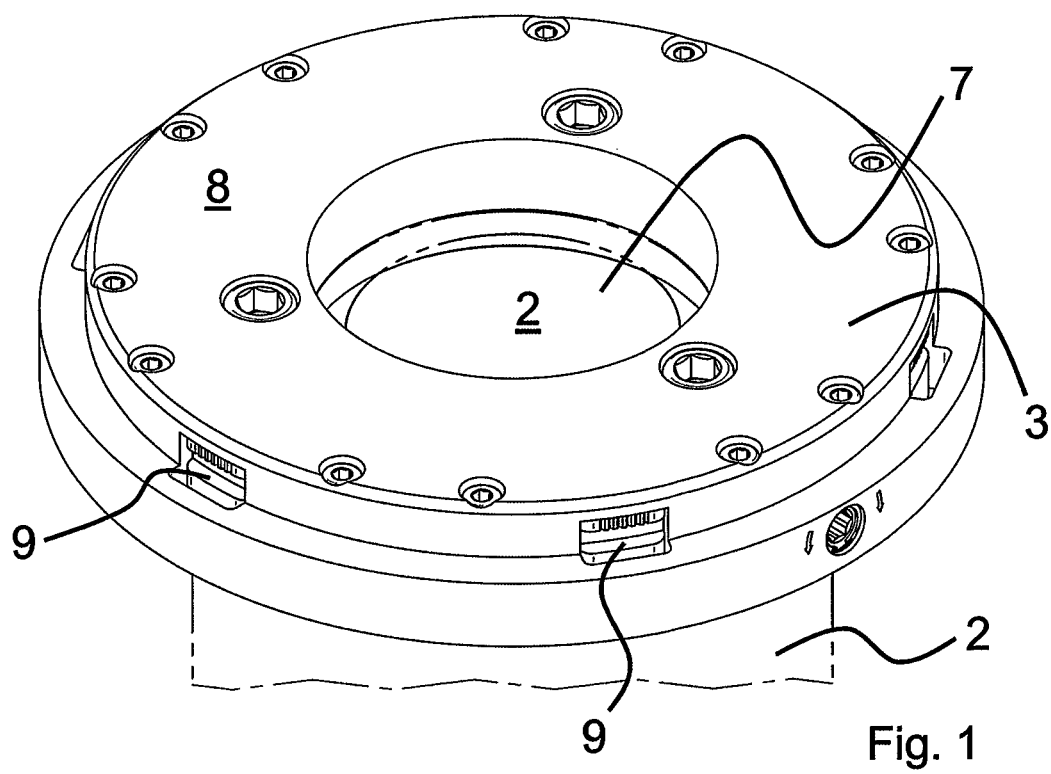

(52) U.S. Cl.
CPC .. *B23B 31/16083* (2013.01); *B23B 31/16141*
(2013.01); *B23Q 3/12* (2013.01); *B23B
2260/088* (2013.01); *Y10S 279/901* (2013.01);
*Y10T 279/1074* (2015.01); *Y10T 279/1921*
(2015.01); *Y10T 279/1941* (2015.01)

(58) Field of Classification Search
CPC ................ B23B 31/16141; B23Q 3/12; Y10T
279/1074; Y10T 279/19; Y10T 279/1921;
Y10T 279/1941; Y10S 279/901
See application file for complete search history.

(56) References Cited

U.S. PATENT DOCUMENTS

| | | | | |
|---|---|---|---|---|
| 3,104,474 A | * | 9/1963 | Rehart | B23B 31/102 |
| | | | | 33/563 |
| 3,689,088 A | * | 9/1972 | Harman | B23B 31/16008 |
| | | | | 279/110 |
| 3,782,742 A | * | 1/1974 | Fink | B23B 31/16045 |
| | | | | 279/110 |
| 5,785,325 A | * | 7/1998 | Daetwyler | B23B 31/1276 |
| | | | | 279/106 |
| 7,637,856 B2 | * | 12/2009 | Kawai | B23B 31/39 |
| | | | | 279/901 |
| 8,209,840 B2 | * | 7/2012 | Norton | B23B 31/1071 |
| | | | | 279/134 |
| 9,283,645 B2 | * | 3/2016 | Schraeder | B23Q 3/12 |
| 9,555,479 B2 | * | 1/2017 | Tiefenbock | B23B 31/16037 |
| 2007/0278751 A1 | * | 12/2007 | Hay | B23B 31/1612 |
| | | | | 279/2.19 |

FOREIGN PATENT DOCUMENTS

| | | | | |
|---|---|---|---|---|
| GB | 117322 A | * | 7/1918 | ....... B23B 31/16129 |
| WO | WO-2005099946 A2 | * | 10/2005 | ......... B23B 31/1612 |

* cited by examiner

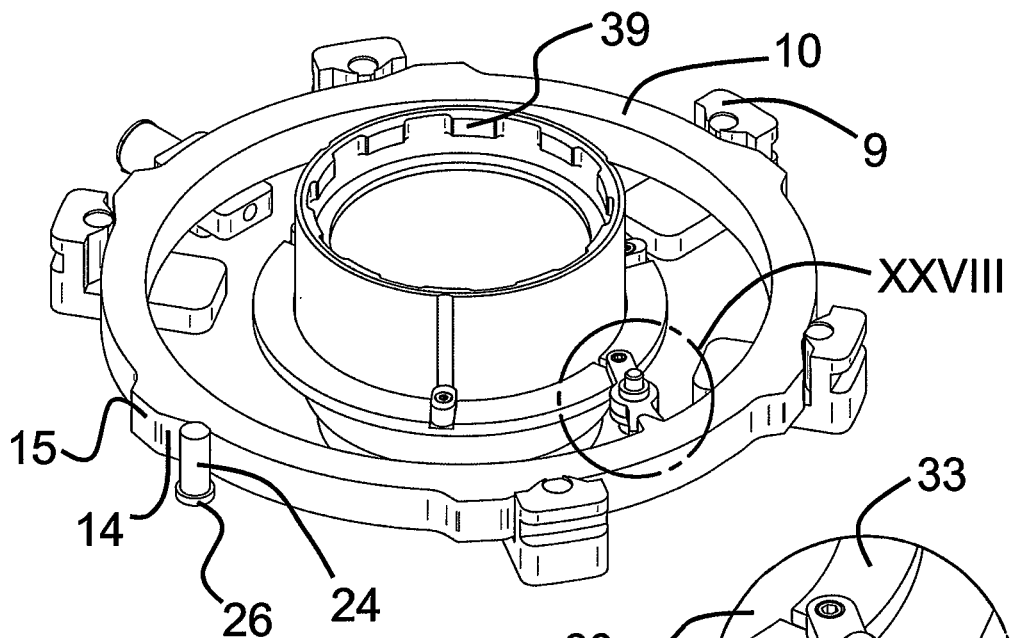
Fig. 27
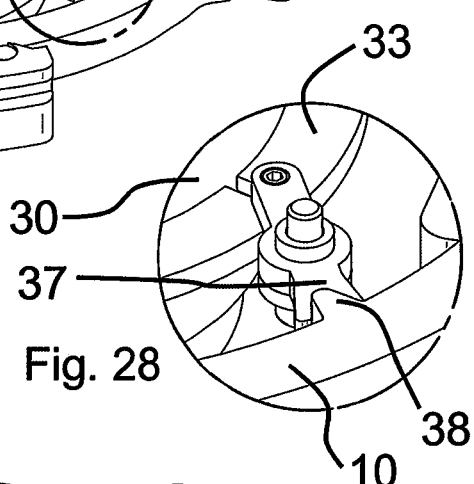
Fig. 28
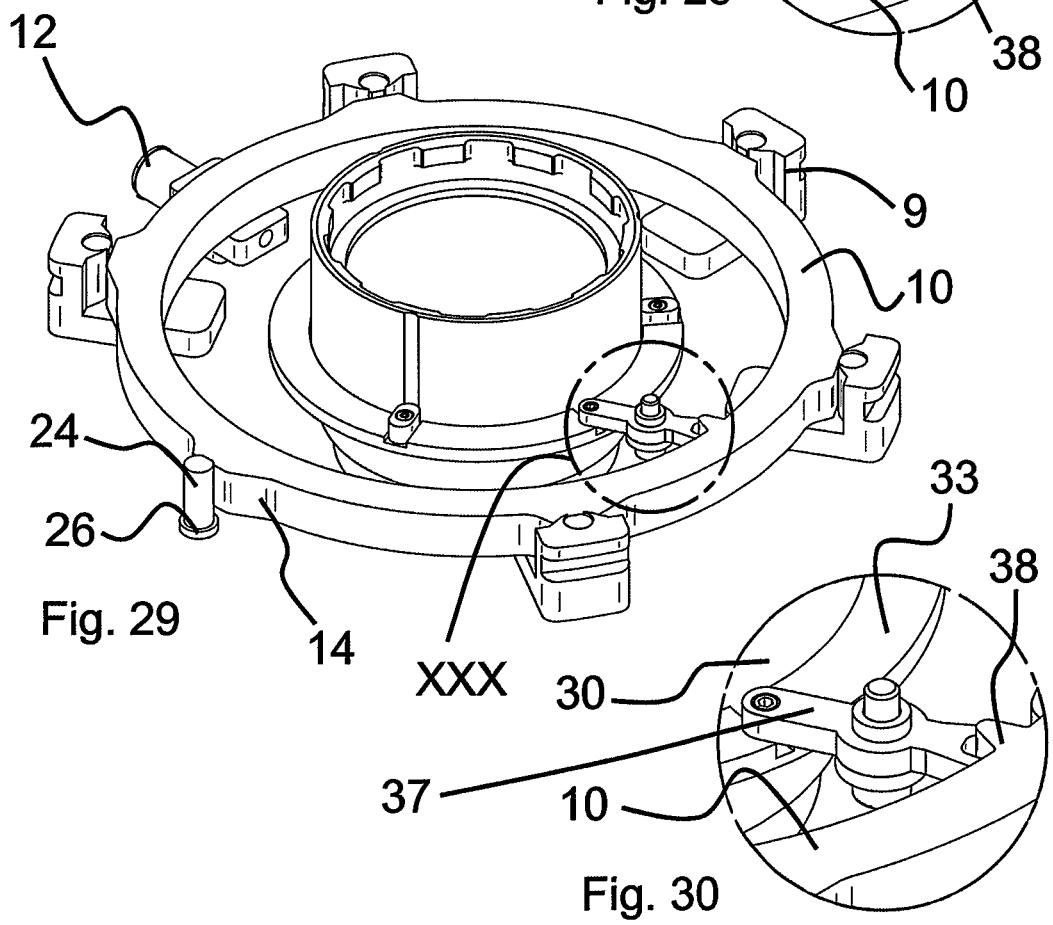
Fig. 29
Fig. 30

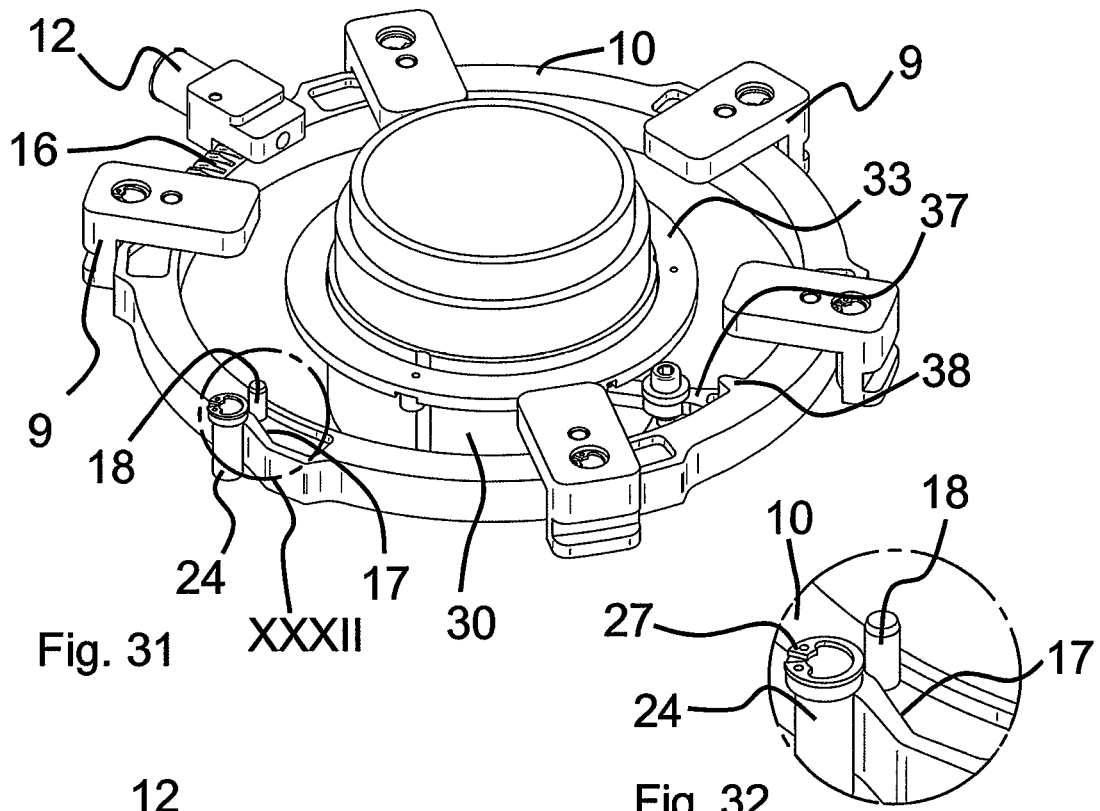
Fig. 31
Fig. 32
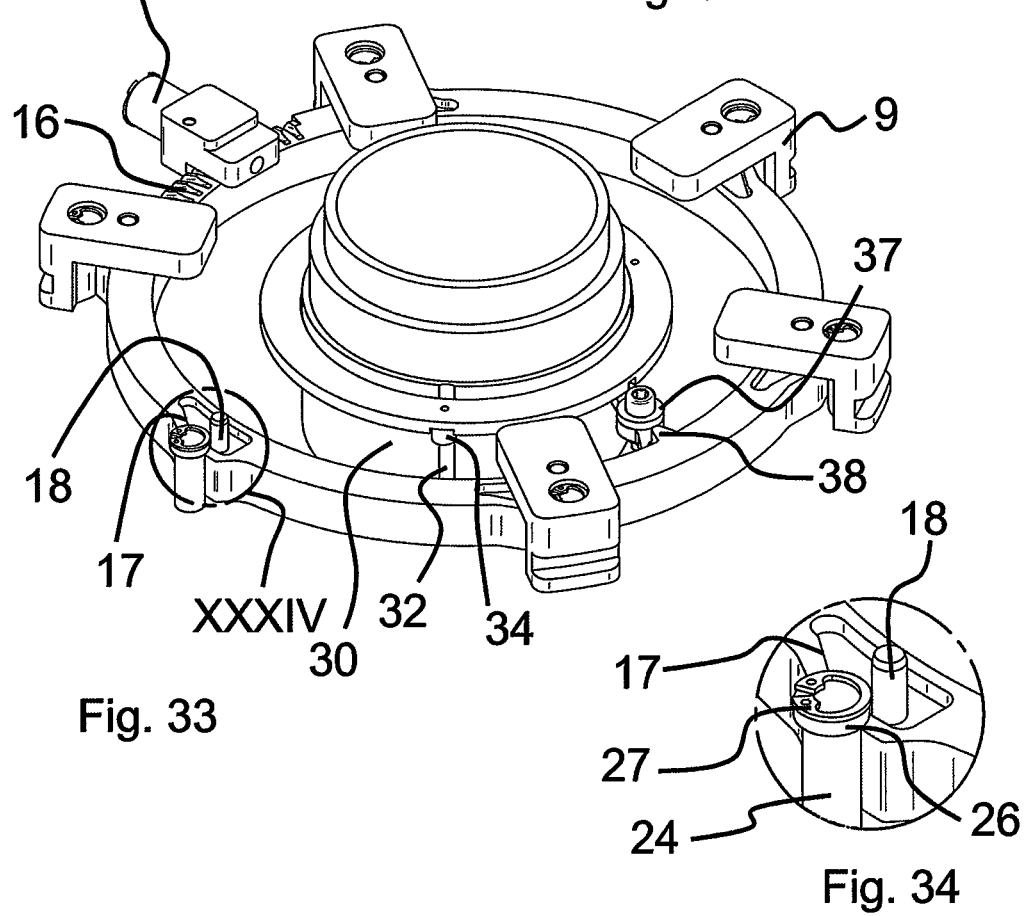
Fig. 33
Fig. 34

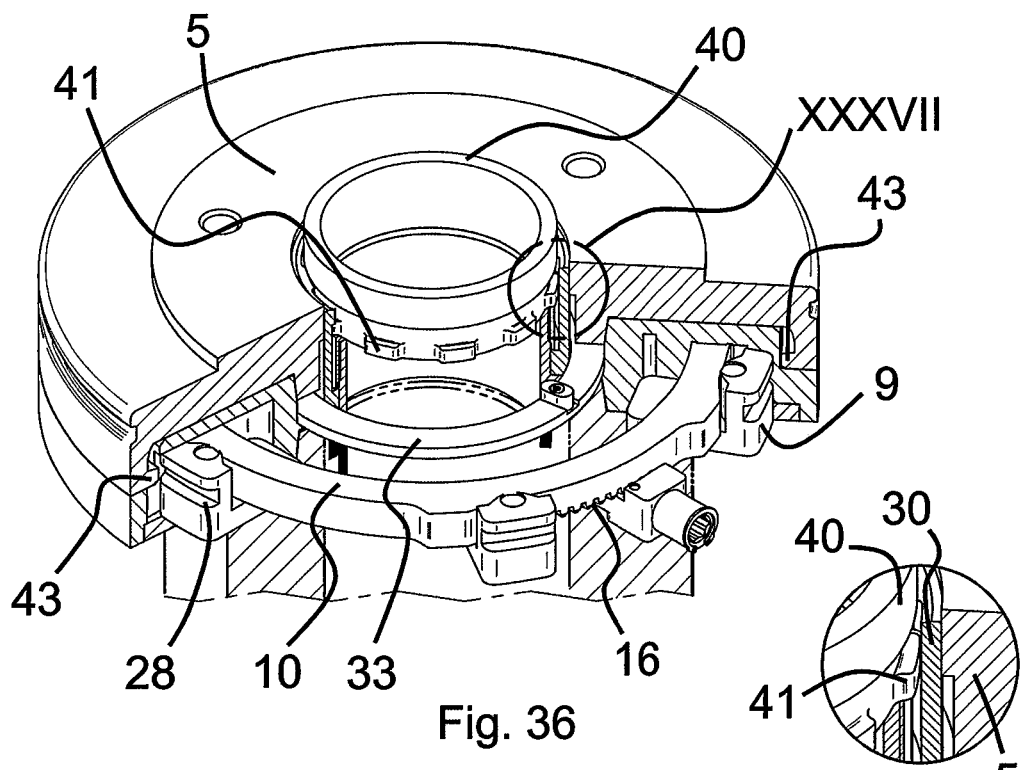
Fig. 36
Fig. 37
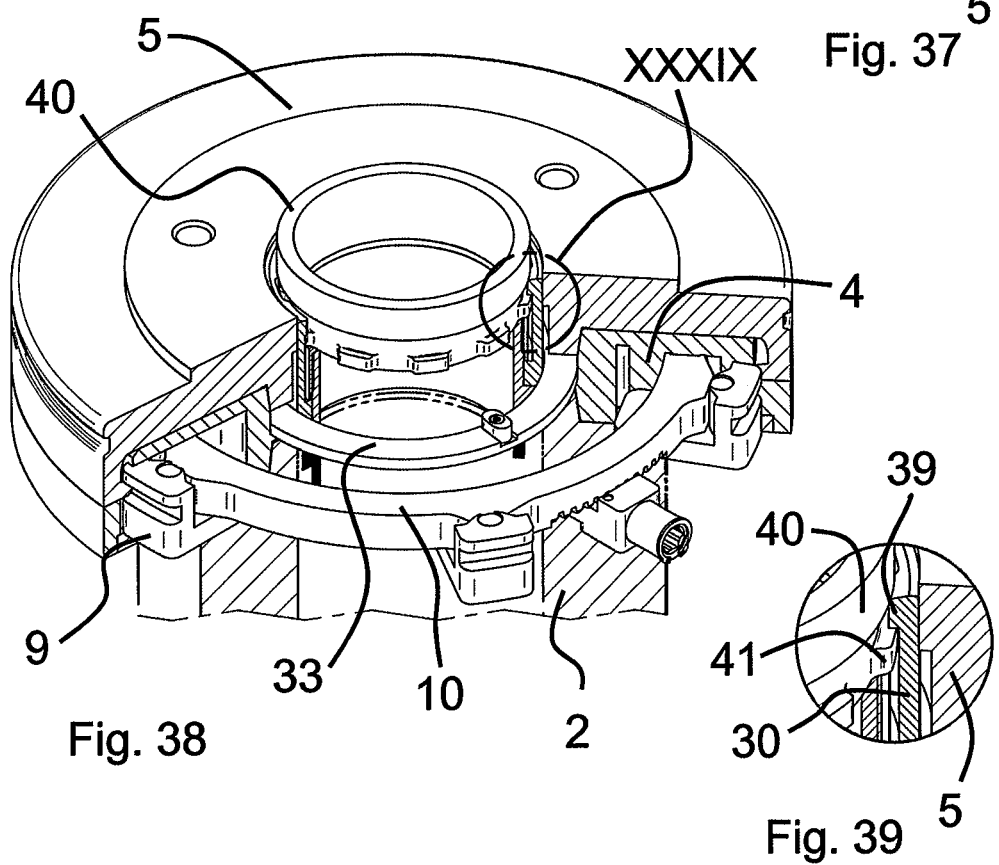
Fig. 38
Fig. 39

CHUCKING MEANS

The invention relates to a chuck apparatus for the fastening to a working spindle of a tool machine, with a chuck body comprising a receptacle for the working spindle, with at least two chuck jaws which can be adjusted radially to the body axis, and with a drive ring, for whose rotation taking place in the circumferential direction a drive is provided.

Such chuck apparatus are widely distributed in the technology under the designation plane spiral chuck, have been publicly previously used by the applicant and described by it, for example, in its total catalog for chucking technology.

Plane spiral chucks get their name from a plane spiral used as a drive ring and which comprises a drive toothing on its side facing away from the chuck jaws into which toothing the drive constructed as a gear engages. A thread is formed on the opposite side of the plane spiral into which thread the chuck jaws engage with drive teeth. These plane spiral chucks are distinguished in that the jaws can be adjusted over the entire chucking range so that workpieces with different chucking diameters can be chucked very rapidly and without displacing the jaws. It should furthermore be noted that these plane spiral chucks have a relatively low axial height in comparison to other chucking chucks, e.g. with wedge rods. However, there are applications in which an axial height which is reduced even further is desirable.

The invention therefore has the basic problem of constructing a chuck apparatus of the initially cited type in such a manner that the most compact structural form possible can be achieved.

This problem is solved in a tensioning means of the initially cited type in that the structure is formed on the drive ring on its outer circumference or its inner circumference for each chuck jaw and which serves for its adjustment.

In the plane spiral chucks known from the prior art there is an axially stacked arrangement of the four components drive, drive toothing, thread of the plane spiral and drive teeth of the chuck jaws which is necessary in this chuck type and opposes a reduction of the structural shape. The invention therefore leaves the known way and follows another way for adjusting the chuck jaws while renouncing the plane spiral in that the sides of the drive ring, which face away from one another, are not provided for adjusting the chuck jaws but rather the circumference of the drive ring is used. It is therefore sufficient to use the front side as the structure of the drive ring without an axial stacking of all corresponding structural components being necessary.

Furthermore, the chuck apparatus according to the invention is distinguished by its very simple construction in which a large receptacle can also be made available in the chuck body, which chuck apparatus is therefore in particular also suitable for chucking workpieces with a large diameter which extend into the working spindle constructed as a hollow spindle.

It is especially preferred in the framework of the invention if the structure is formed by a control curve formed on the outer circumference and with a control cam serving for adjusting each chuck jaw radially outward. In this embodiment the chucking of the workpiece or of the tool is provided by radially outwardly adjustable chuck jaws so that an inner chucking takes place in which the chucking force is increased by the action of the centrifugal force arising during the operation, that is, differently than that a lower boundary of the acting chucking force can always be indicated in the case of an outer chucking.

Furthermore, it is provided in the framework of the invention that the drive is formed by a drive wheel which can rotate about a radial axis and which engages in a drive toothing formed on the drive ring, and that a return curve is formed on the drive ring side comprising the drive toothing, into which curve the chuck jaw engages with a control member. This embodiment makes a forced guidance available which brings about an adjusting of the chuck jaw in the direction of opening when the control cam no longer makes contact with the associated chuck jaw by the rotating of the drive ring in the direction corresponding to the loosening.

Furthermore, it is preferred in the framework of the invention if an indicator curve is formed on the outer circumference of the drive wheel for cooperating with an indicator pin for displaying the rotary position of the drive ring.

With this indicator pin, the rotary position of the drive ring can be directly determined optically and if necessary also by sensors and it can be checked in particular with it whether the control cams rests on the chuck jaws and adjusts them radially outward or whether no reliable chucking and the replacement of the tool or workplace is possible due to the lacking contact.

It also proved to be advantageous in the framework of the invention if the chuck jaw has a basically L-shaped form on whose base shank the control member is arranged and if a pin receptacle which is open to the drive ring is formed in the second shank into which receptacle a contact pin is inserted. Furthermore, it is advantageous if the contact pin has a plane surface on the side facing the drive ring and if the contact pin comprises a pin foot. This design of the chuck jaw improves its guidance, which can take place on the one hand by the chuck body and on the other hand also by the drive ring, wherein in particular the base shank is also made available in order to carry the control member cooperating with the return curve. The plane surface of the contact pin brings about a good contact on the control curve of the drive ring, wherein the pin foot to be secured by a securing ring in the chuck jaw ensures the secure receiving of the contact pin in the chuck jaw.

It is furthermore favorable if the chuck jaw comprises a radially outside groove in order to make possible, if necessary, a real positive lock opposite the workpiece or tool to be chucked.

It is quite especially preferred in the framework of the invention if the chuck apparatus forms the base flange of a rapid replacement device which comprises a replacement flange which can be chucked by the base flange and can be connected to a workpiece chuck apparatus. It is often necessary in chucking technology that chuck apparatus fastened on the work spindle is to be replaced by another one in order to, for example, replace a wedge rod chuck by an expansion chuck for another application. To this end, three screws must conventionally be loosened as a rule by which the chuck body is fastened on the work spindle in order to subsequently loosen the air pipe connection for adjusting the chuck jaw. A complete chuck apparatus replacement takes about 30 to 40 minutes, so that correspondingly high equipment expenses are associated with this and it is desirable to make a more rapid replacement of the spiral chuck. This is made possible by the chuck apparatus according to the invention, which can remain continuously connected to the working spindle and forms, in cooperation with a replacement flange, a rapid replacement device with which the replacement flange carrying the workpiece chuck apparatus can be chucked by the chuck apparatus as base flange and therefore the workpiece chuck apparatus is reliably connected to the working spindle. Therefore, a replacement of the workpiece chuck apparatus is possible by the chuck apparatus according to the invention as part of a rapid replacement device in a very short time with a high concentricity and a high run-out as well as a very good repetition accuracy.

It is advantageous for the use of the chuck apparatus according to the invention as base flange if an air pipe which can rotate at least in a limited manner about the spindle axis is provided whose rotation can be derived by at least one coupling member from the rotation of the drive ring. This air pipe adapter ensures that an orderly functioning of the workpiece chuck apparatus is possible since the actuation of its chuck jaw is made available, for example, by the air pipe adapter.

At least one axially running groove is formed to this end on the air pipe adapter into which groove a sliding block arranged on a carrier ring engages wherein the coupling member is provided for rotating the carrier ring. This design has the special advantage that during the adjusting of the carrier ring for chucking the replacement flange, at the same time the air pipe adapter is also rotated so that only the activation of the drive is necessary in order to carry out the adjustments in the chuck apparatus as base flange which are necessary for a replacement of the workpiece chuck apparatus.

A possible alternative is formed in that the carrier ring comprises an outer toothing and the drive ring comprises an inner toothing into which a drive pinion engages as the coupling member.

It is furthermore conceivable that the coupling member is formed by a strut rigidly coupling the drive ring and the carrier ring. However, it is also advantageous if the coupling member is formed as a two-arm lever supported on a shaft and whose free lever ends are coupled to the drive ring and to the carrier ring. In particular when using the two-arm lever and the drive pinion a translation or gearing down is possible so that the rotation carried out on the drive ring can lead to a deviating angle of rotation of the carrier ring.

In order to actuate the workpiece chuck apparatus, substantially axially acting forces must be transferred by the air pipe adapter, to which end catch cams are formed on the air pipe adapter in the circumferential direction with a mutual distance.

A replacement flange for the connection to a chuck apparatus of the previously described type is also part of the invention, wherein a collar is formed on the replacement flange from which collar a radially inward protrusion projects. This protrusion is in particular suited for interacting with the radially outer chuck jaw comprising a groove, wherein it is advantageous if the walls of the groove of the chuck jaw and of the protrusion, which walls will make contact, are designed with an inclination in order to generate a downward traction effect.

Furthermore, it is advantageous if a coupling casing is provided on the replacement flange on which casing countercams are constructed in the circumferential direction with a mutual distance whose distance is measured in such a manner that upon a starting movement taking place in an axial direction whereby the one or more catch cams of the base flange can pass between the countercams. In this manner a covering of the catch cams with the countercams takes place during the rotation of the air pipe adapter brought about by the drive ring so that the transfer of the tractive forces acting in the axial direction is made readily possible.

Figure 2:
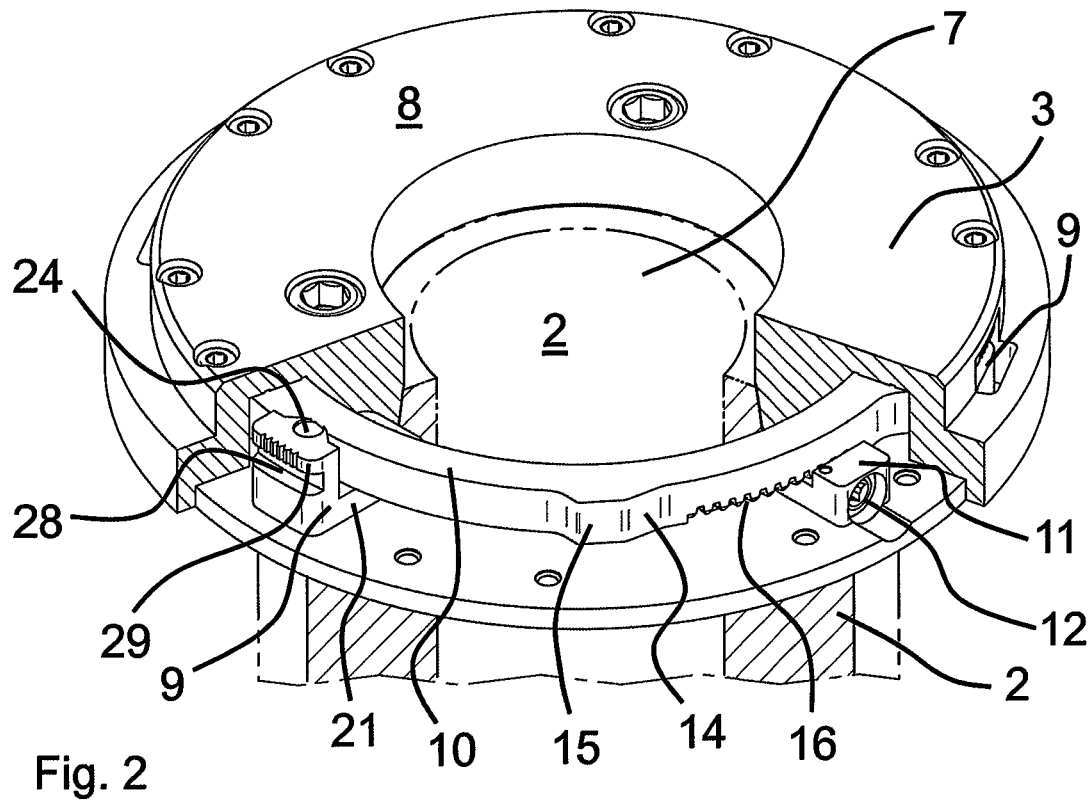
Figure 3:
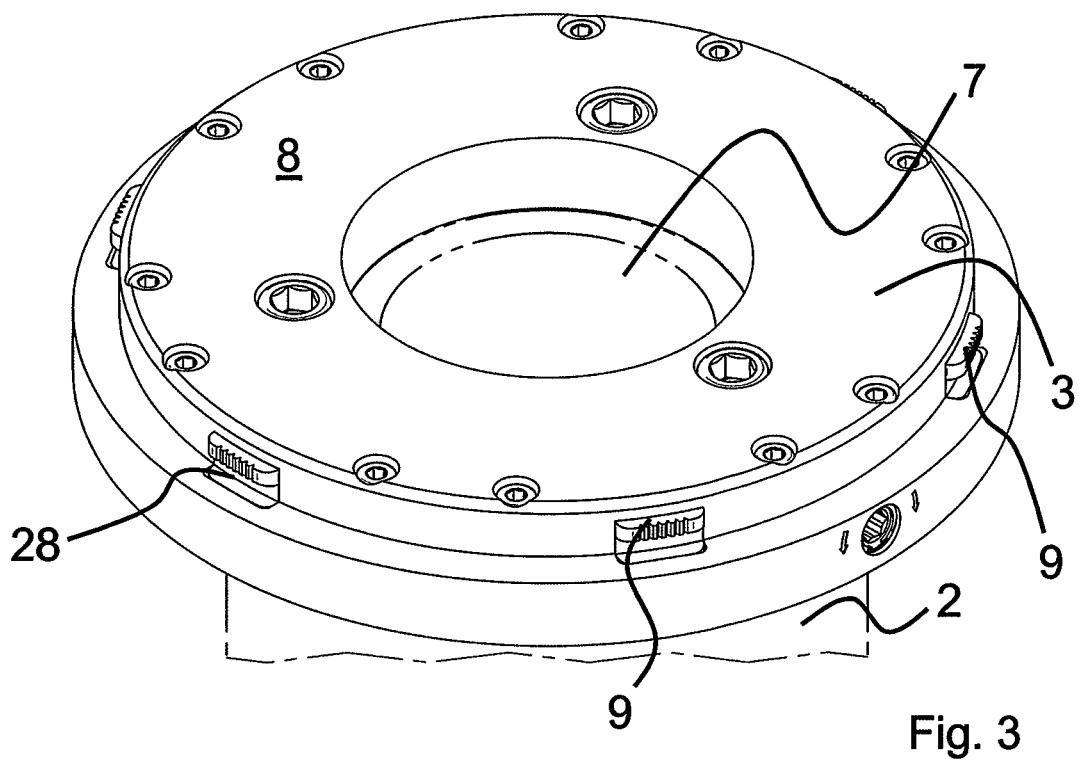
Figure 4:
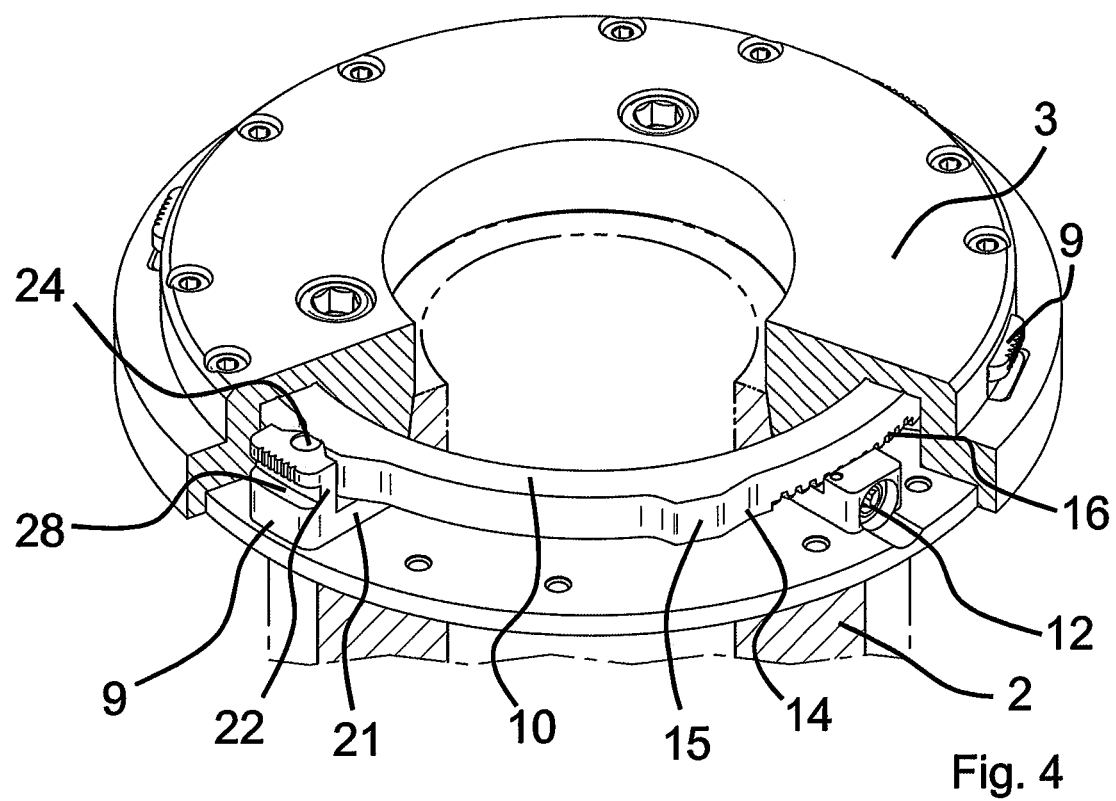
Figure 5:
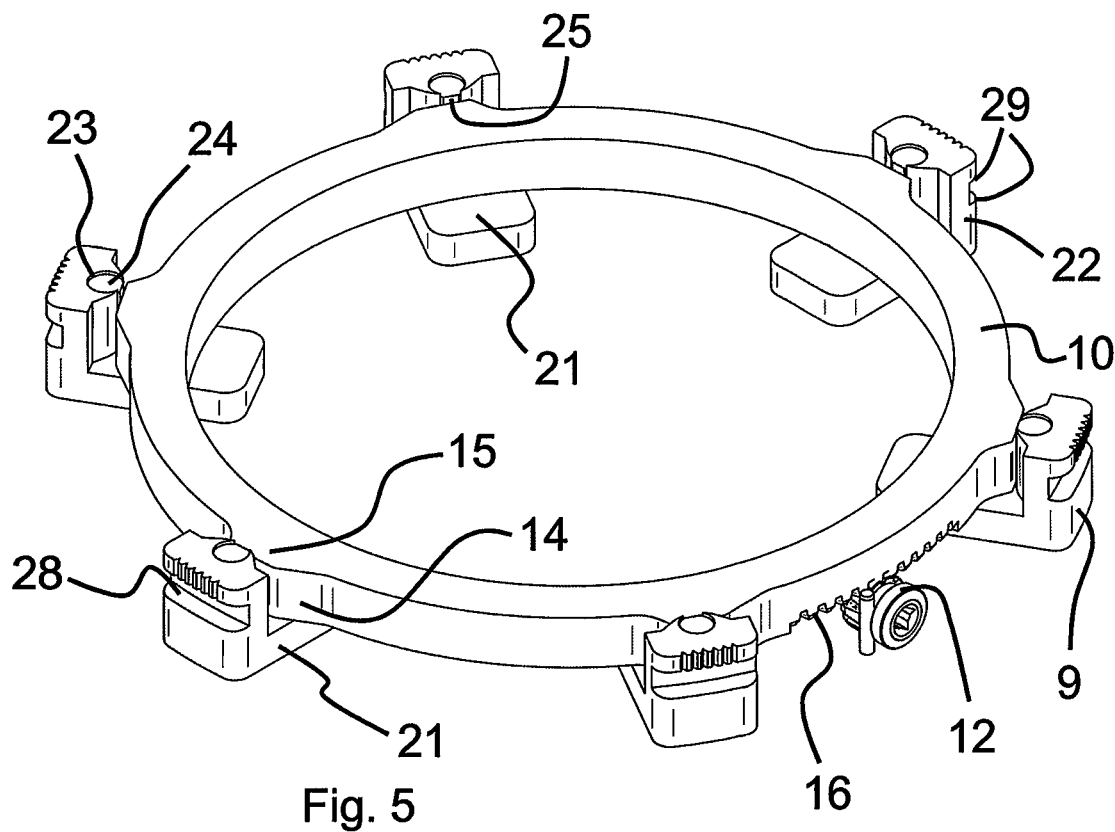
Figure 6:
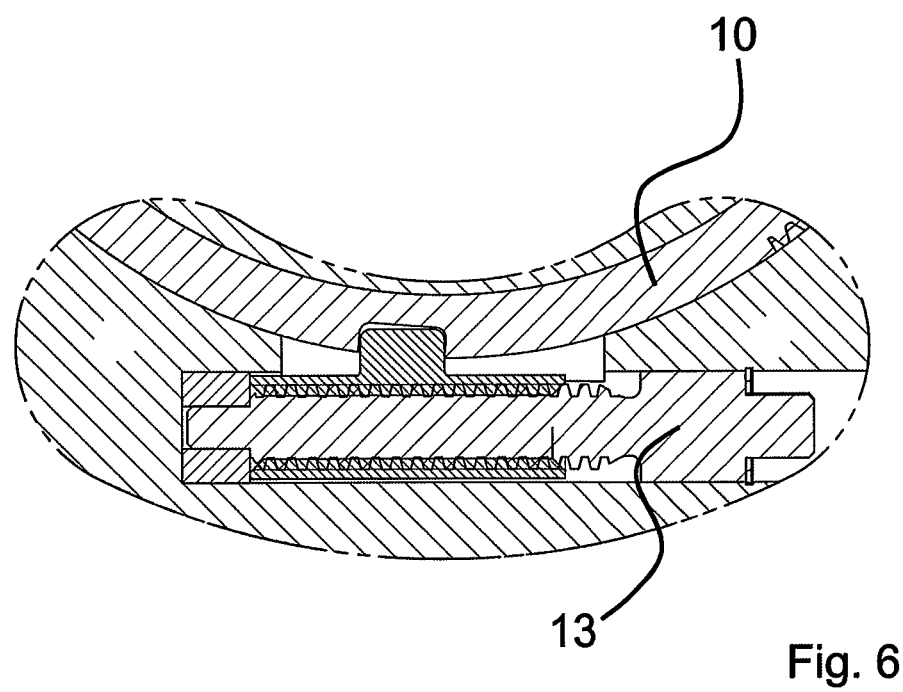
Figure 7:
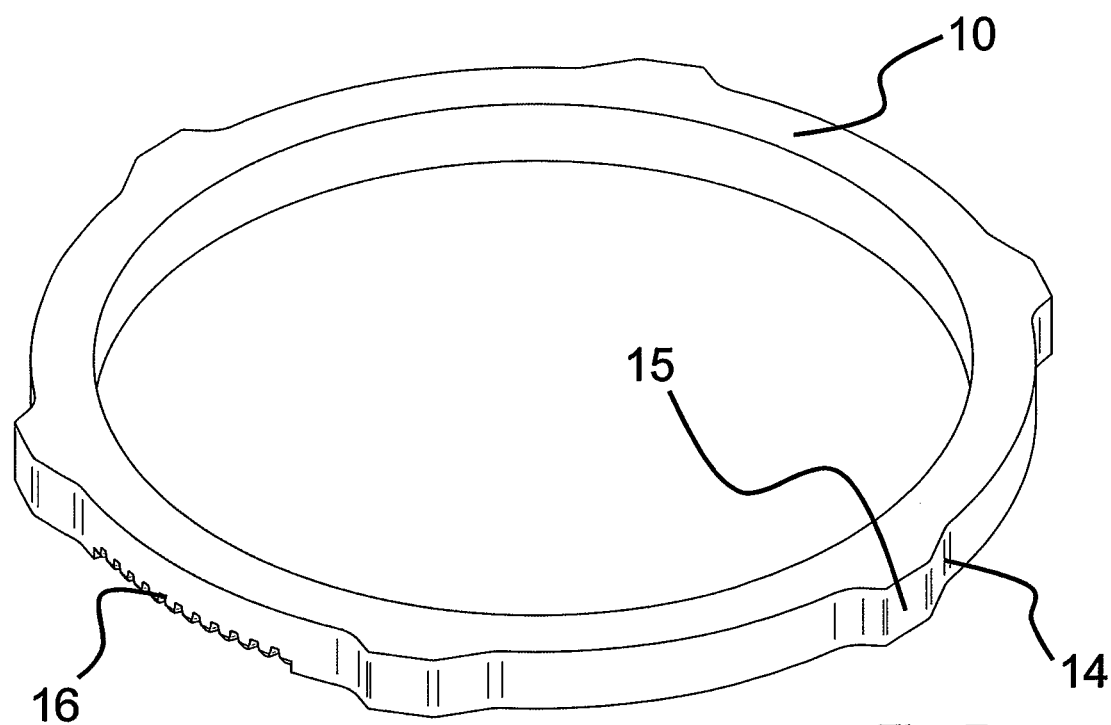
Figure 8:
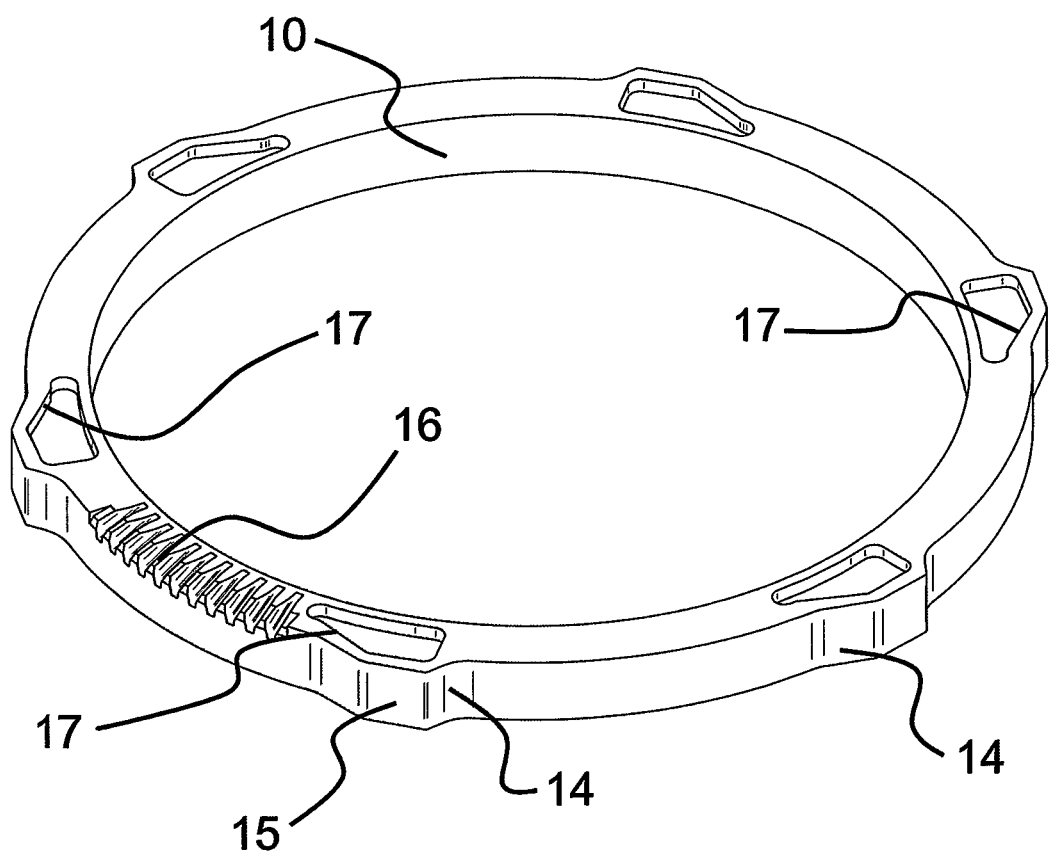
Figure 9:
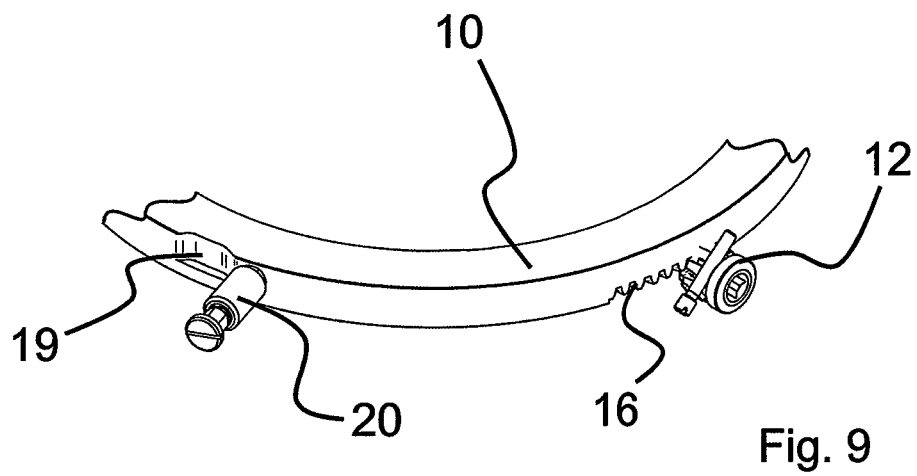
Figure 10:
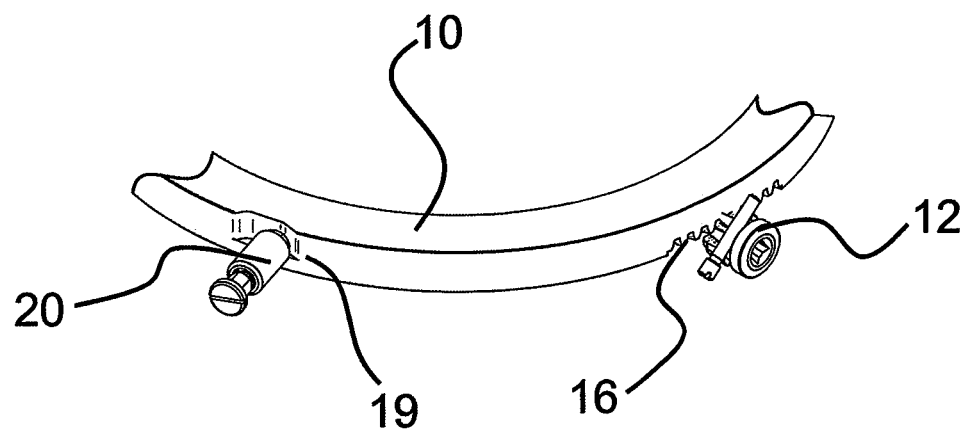
Figure 11:
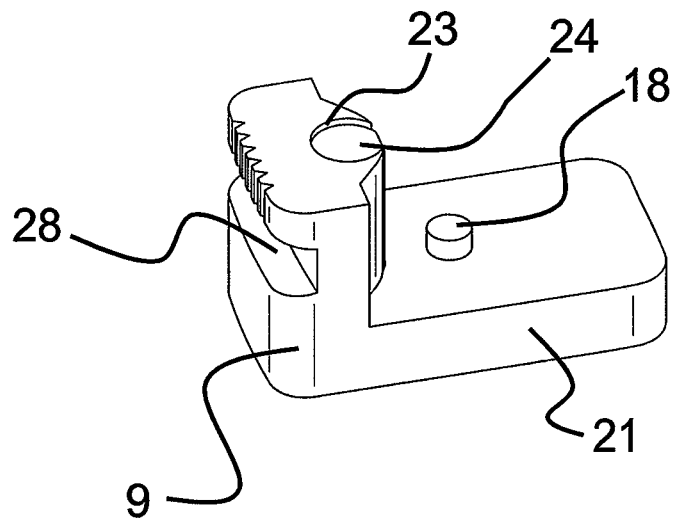
Figure 12:
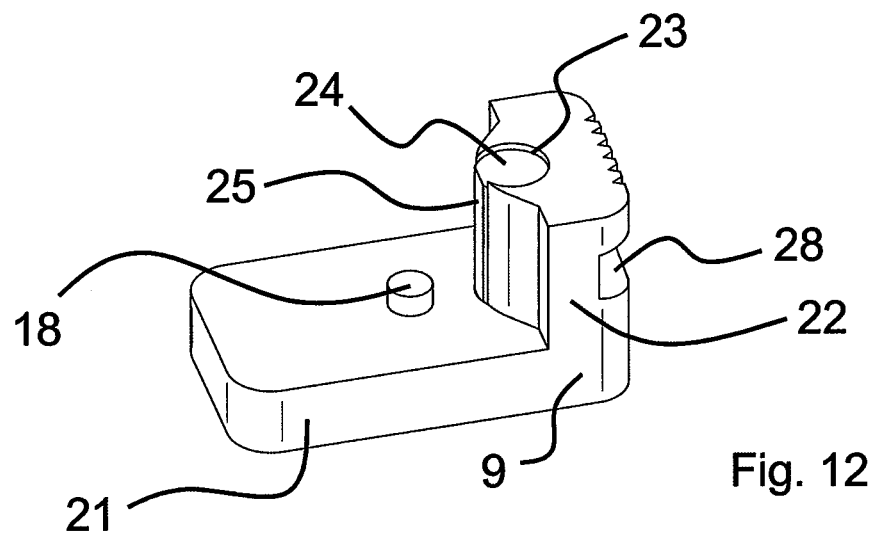
Figure 13:
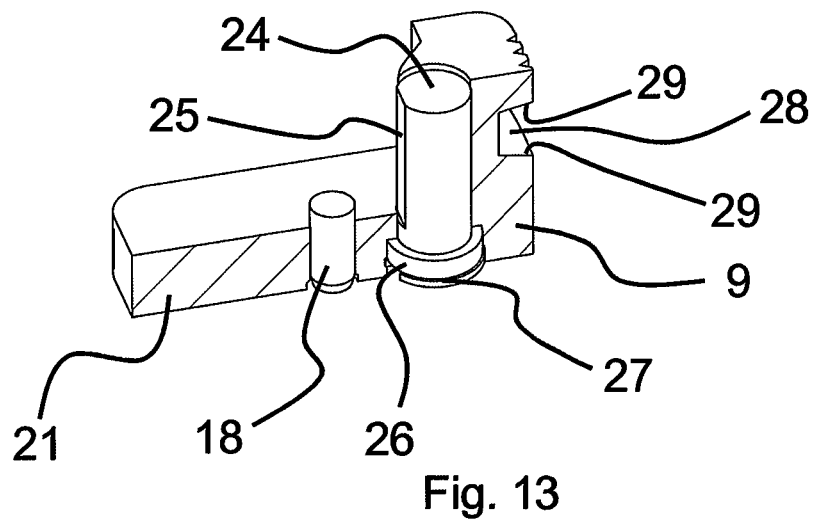
Figure 14:
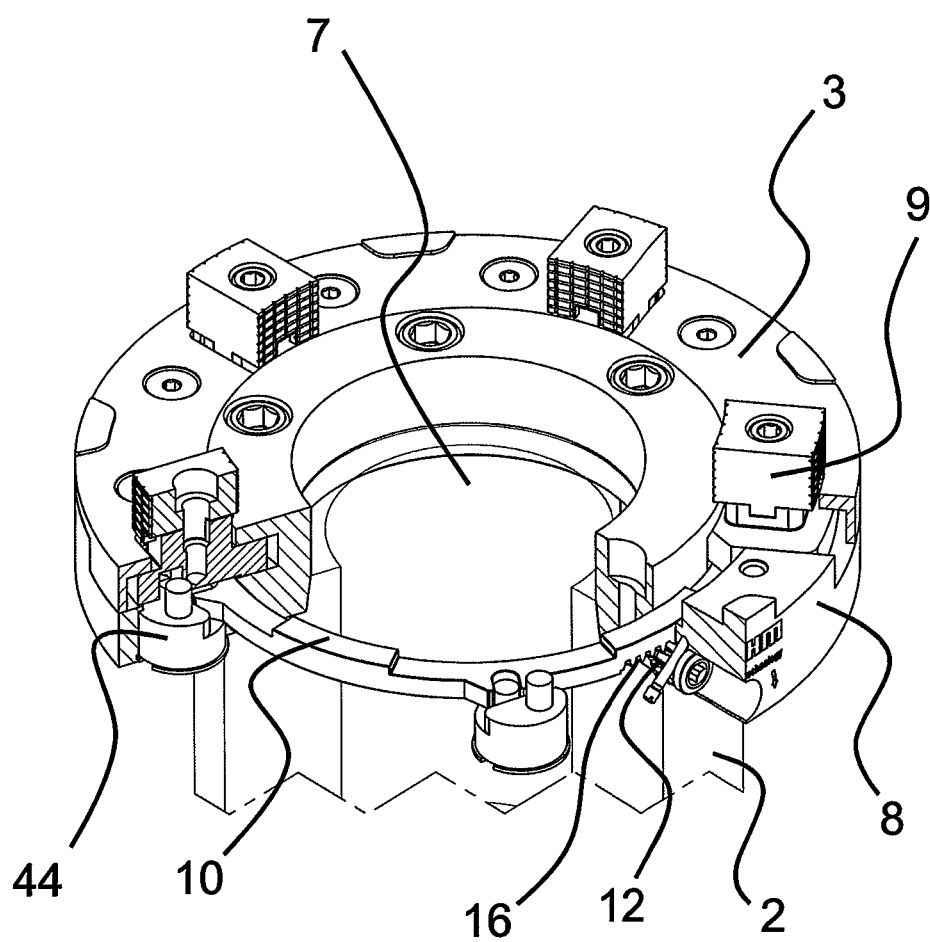
Figure 15:
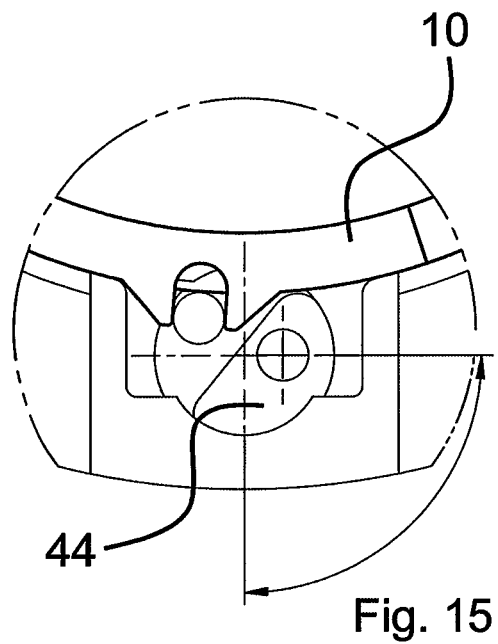
Figure 16:
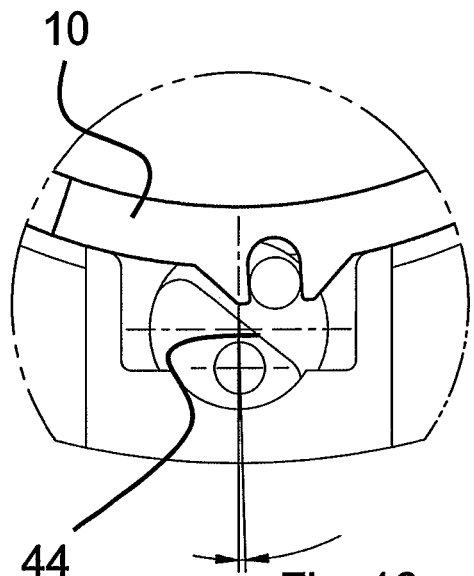
Figure 17:
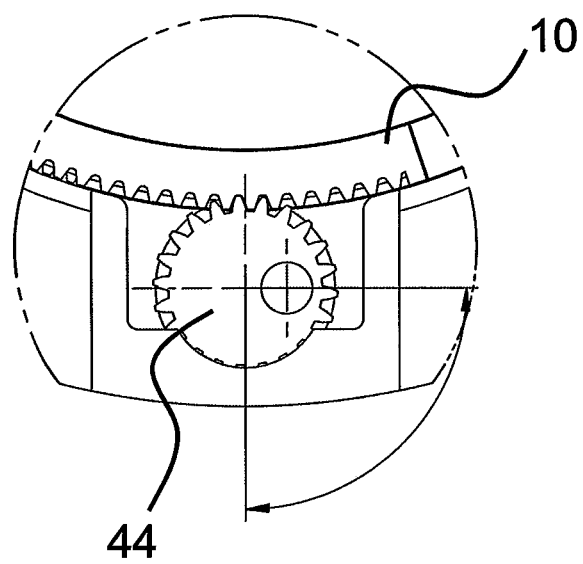
Figure 18:
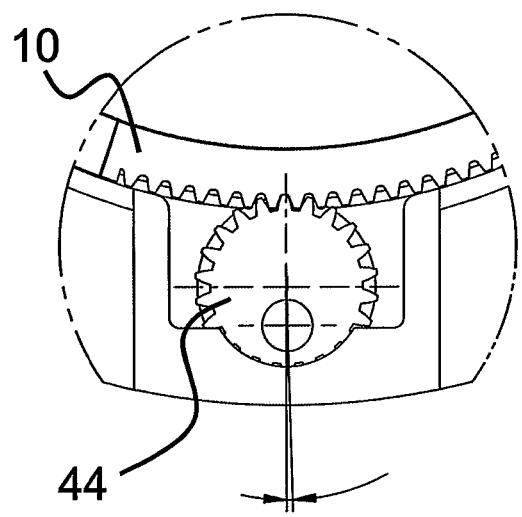
Figure 19:
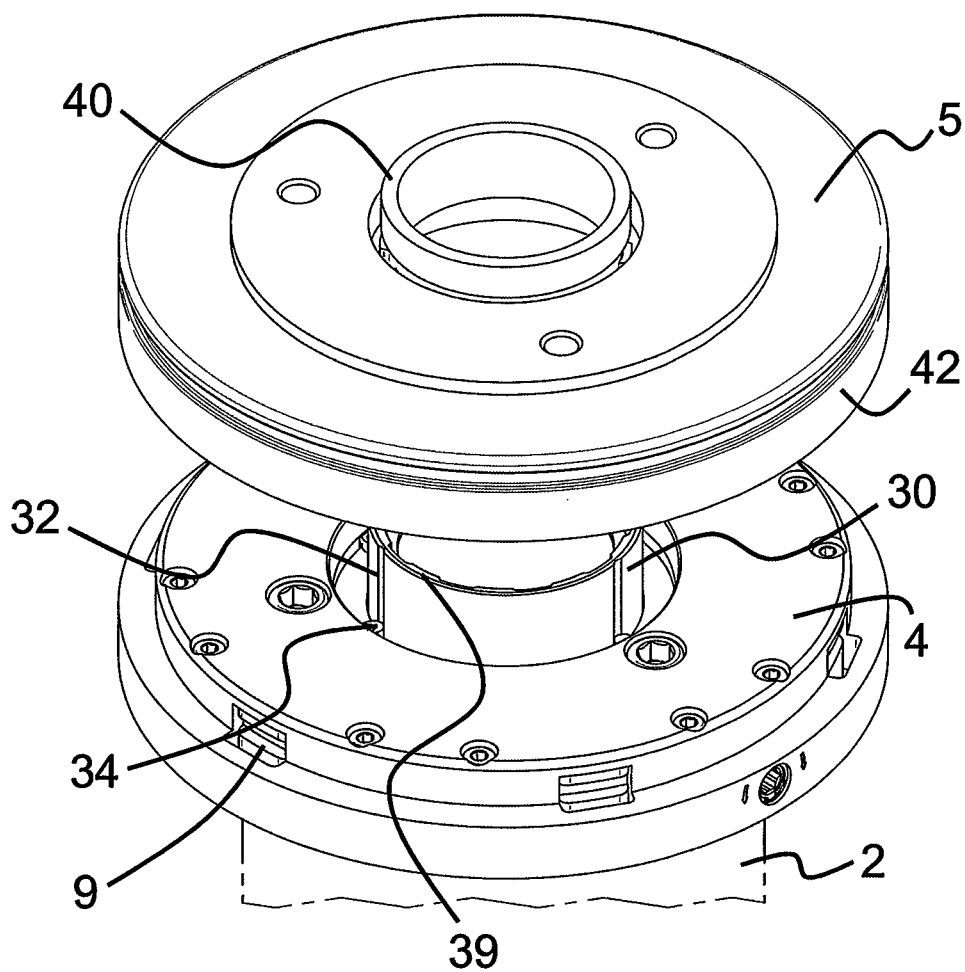
Figure 20:
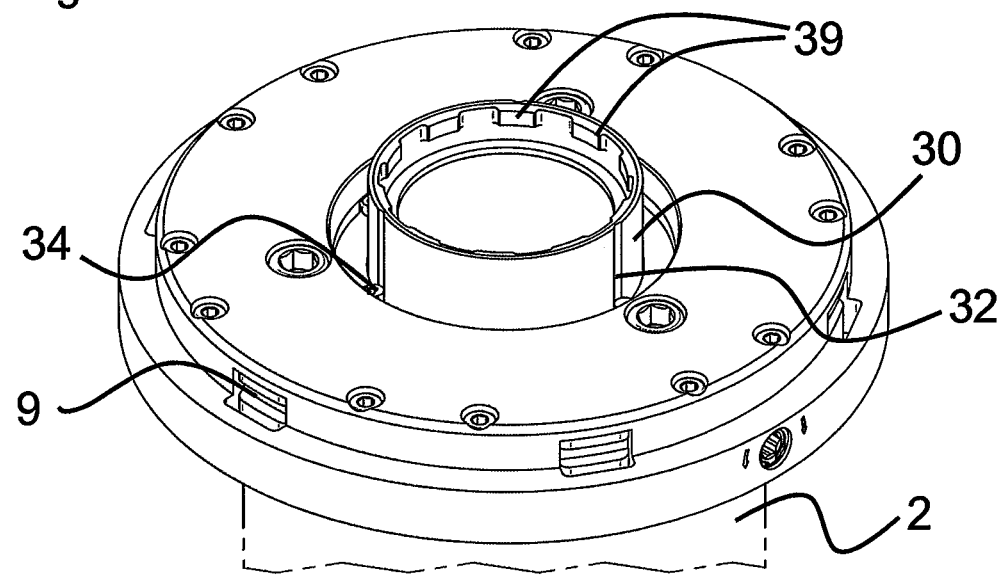
Figure 21:
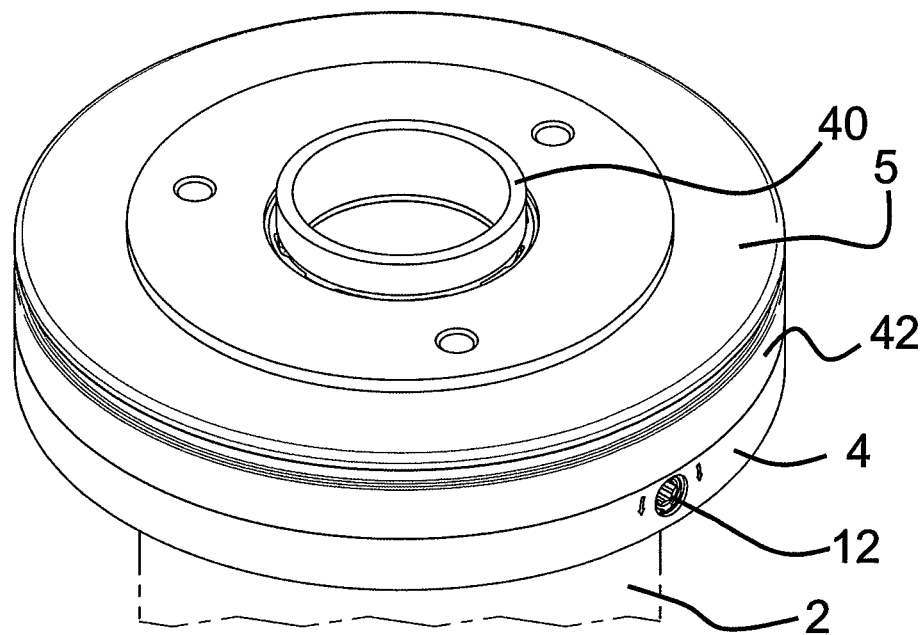
Figure 22:
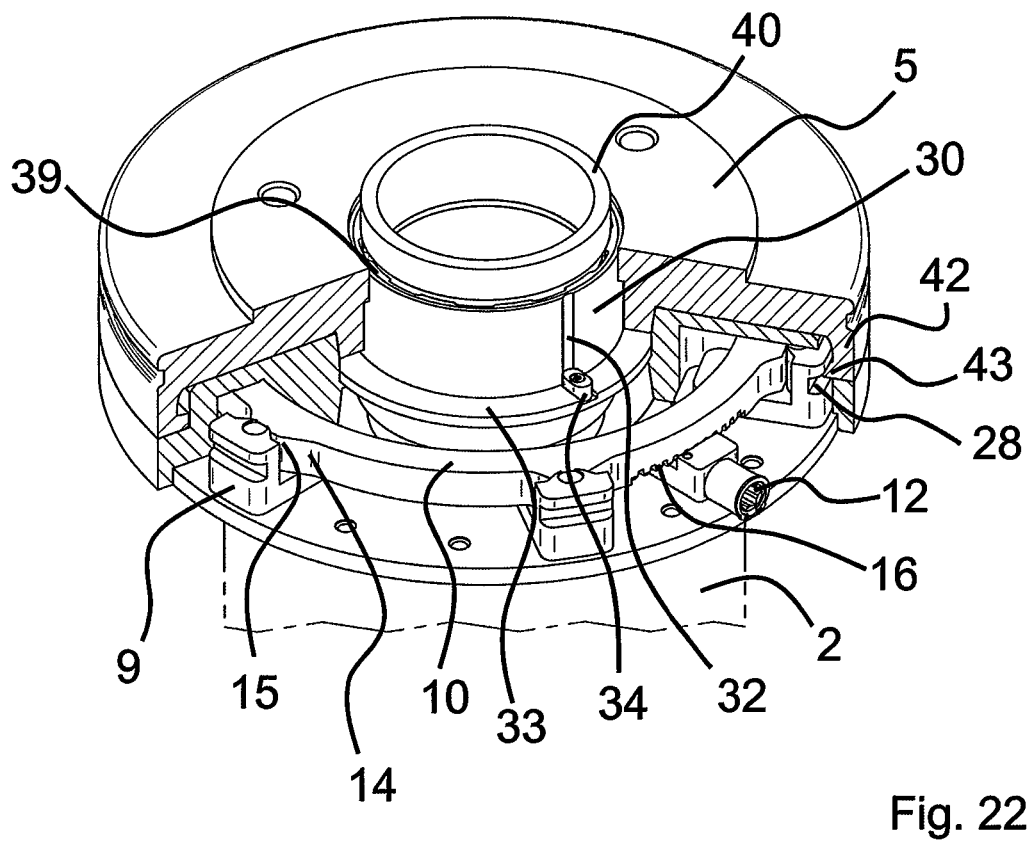
Figure 23:
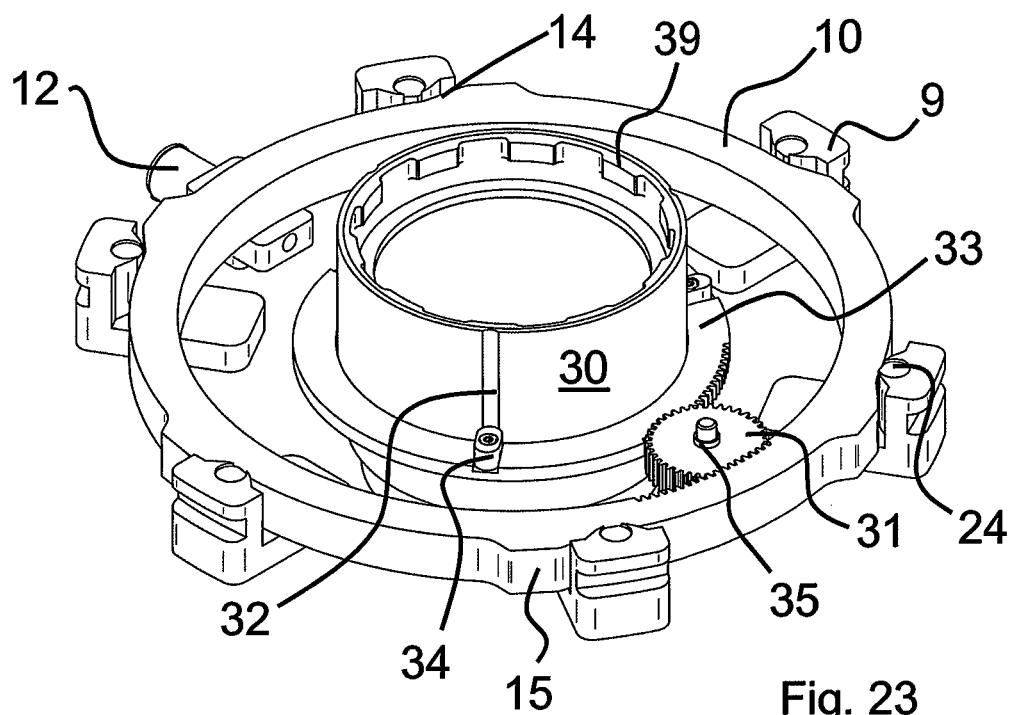
Figure 24:
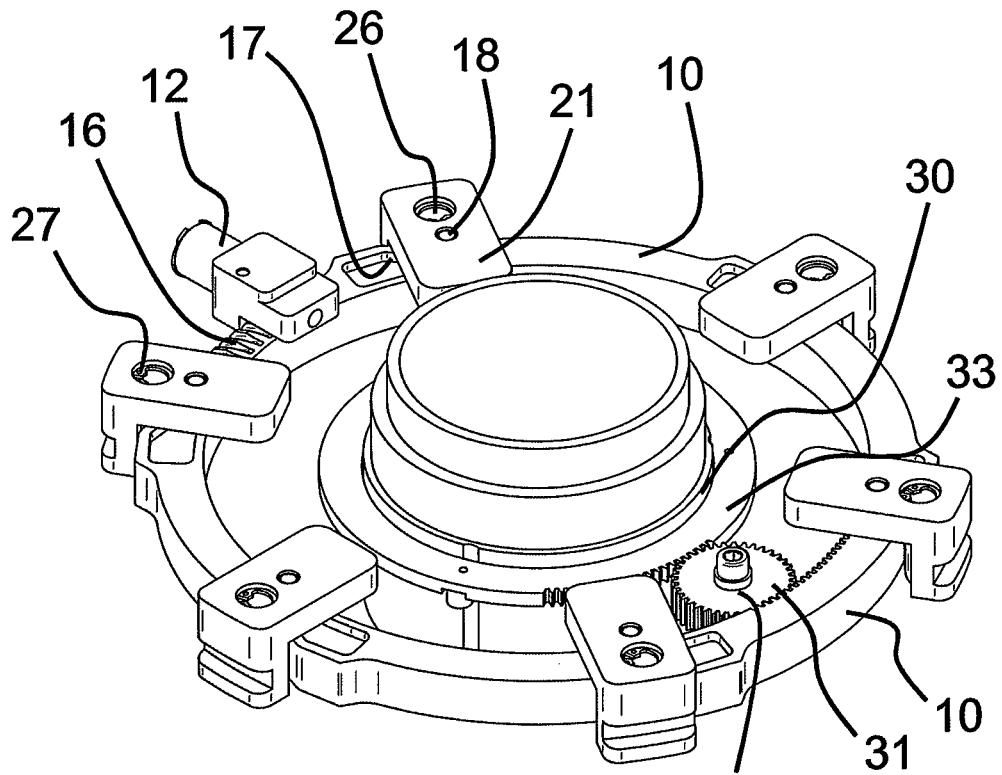
Figure 25:
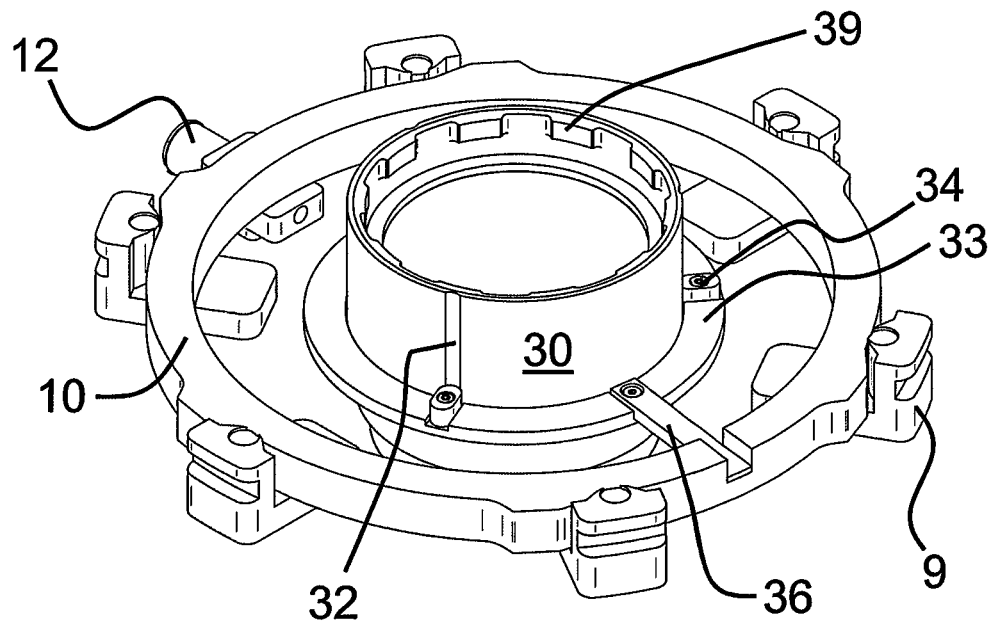
Figure 26:
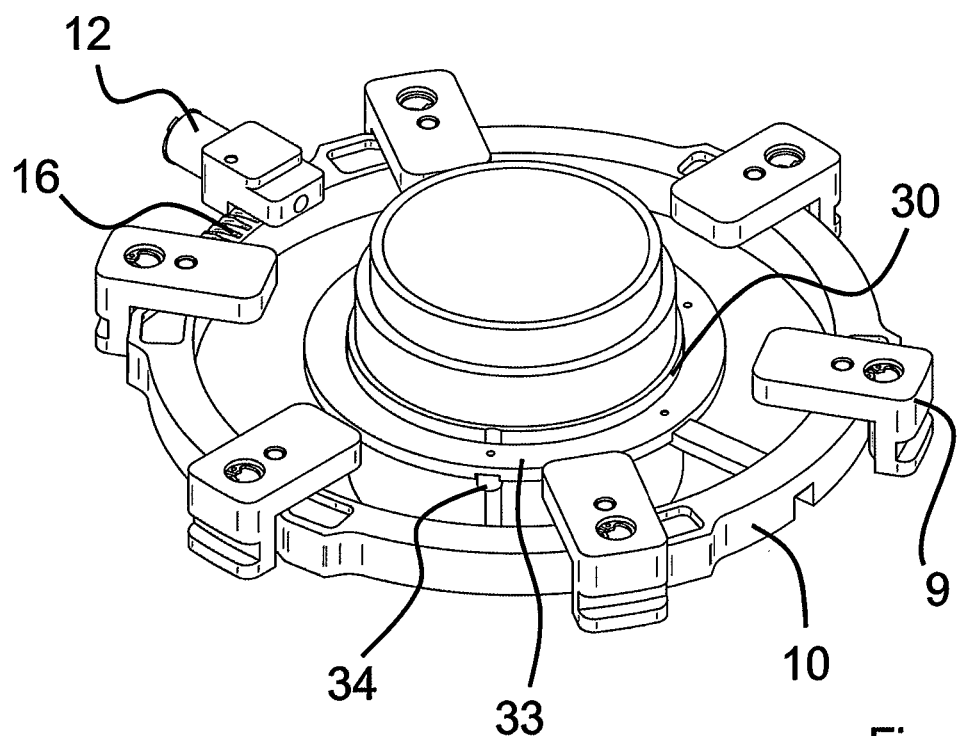
Figure 35:
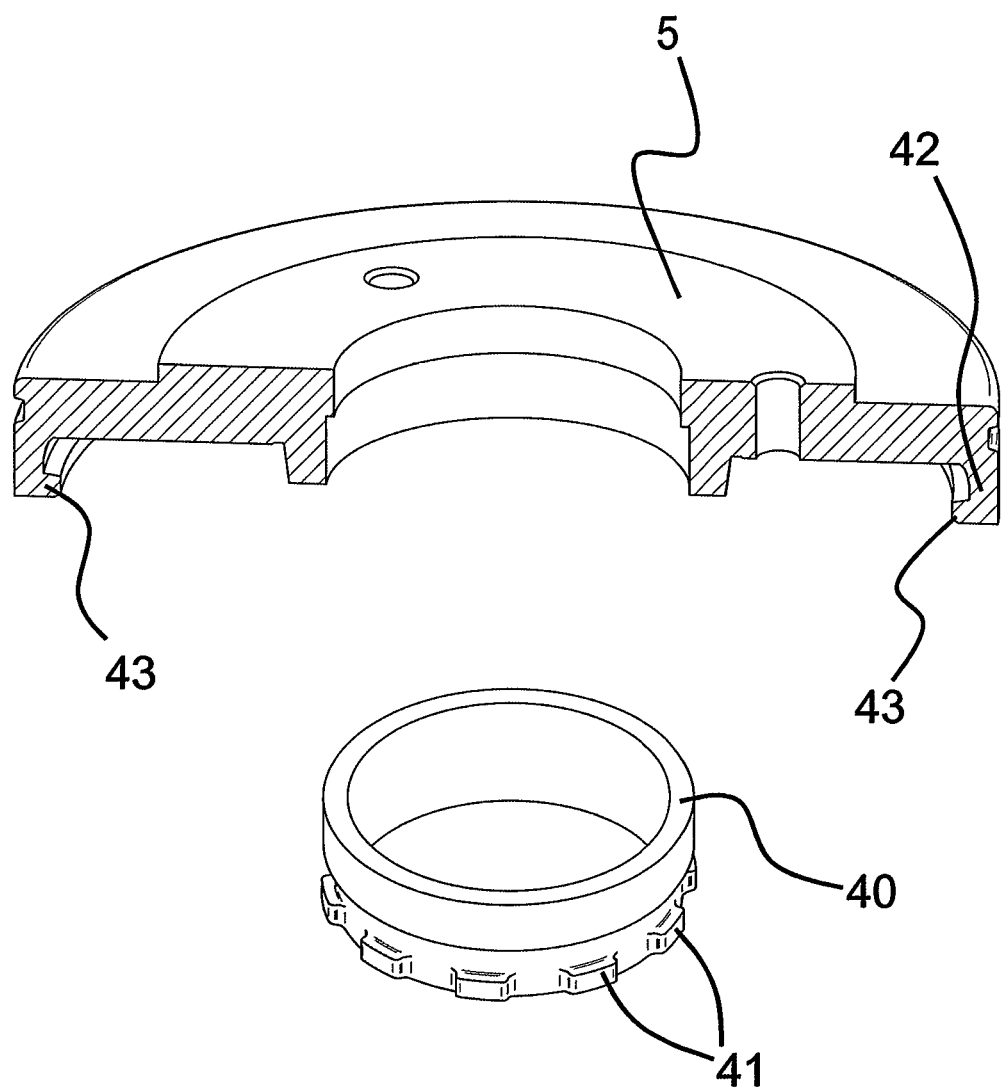
Figure 40:
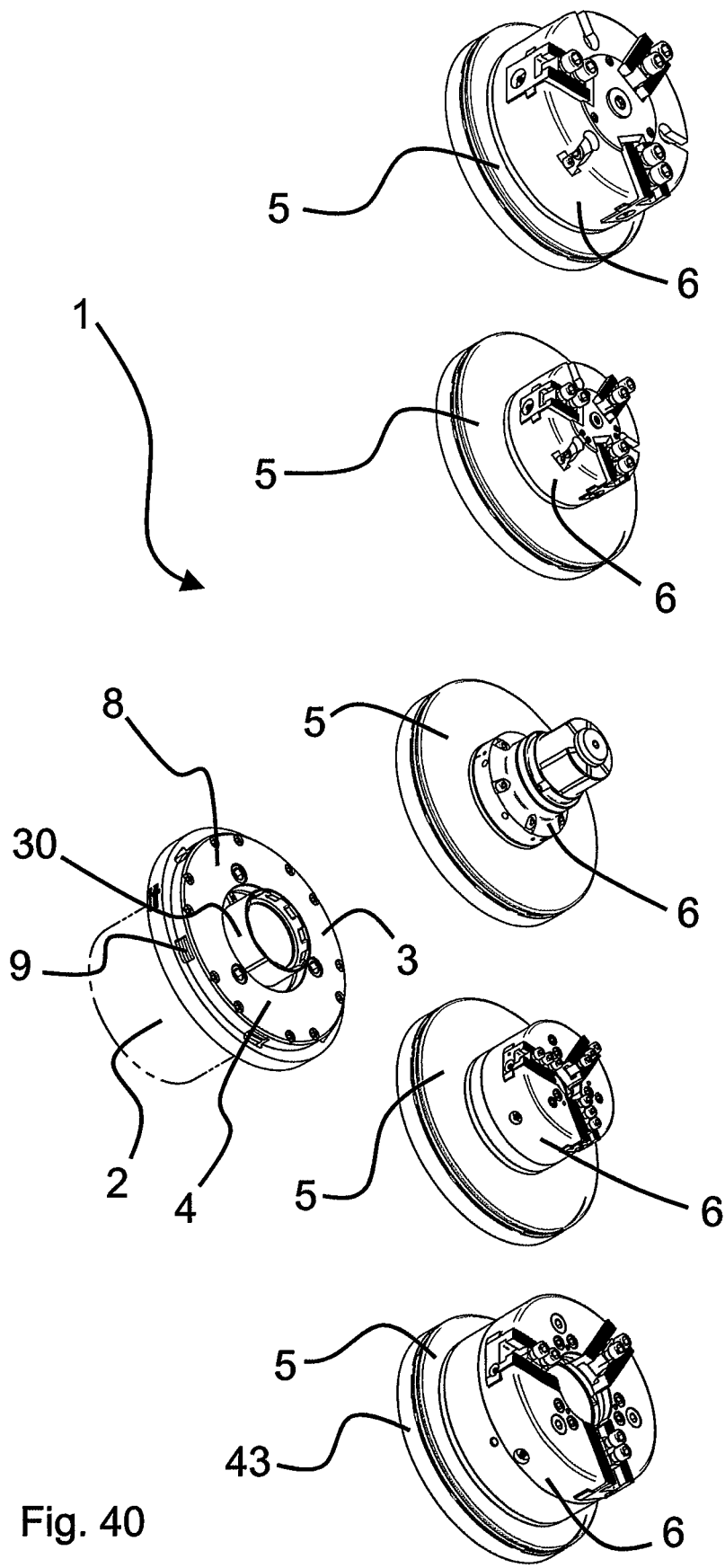

The invention is explained in detail in the following using exemplary embodiments shown in the drawings; in which:

FIG. 1 shows a perspective view of the chuck apparatus according to the invention with the chuck jaws in the open position, FIG. 2 shows a view corresponding to FIG. 1 with a free section in sectors of the chuck body, FIG. 3 shows a view corresponding to FIG. 1 with the chuck jaws in the chucking position, FIG. 4 shows a view, corresponding to FIG. 2, of the chuck apparatus in FIG. 3, FIG. 5 shows an isolated perspective view of the drive ring with the chuck jaws in the chucking position, FIG. 6 shows an embodiment with a spindle drive arranged tangentially to the drive ring as an alternative for realizing the drive, FIG. 7 shows a perspective view of the isolated drive ring from above, FIG. 8 shows a perspective view of the drive ring from below, FIG. 9 shows a perspective view of the drive ring with indicator curve and indicator pin in the rotary position, FIG. 10 shows a view corresponding to FIG. 9 in the other rotary position, FIG. 11 shows a perspective view of the isolated chuck jaw, FIG. 12 Shows an isolated view of the chuck jaw from another perspective, FIG. 13 shows a cross section through the chuck jaw, FIG. 14 shows an alternative embodiment of the chuck apparatus according to the invention with an eccentric which can be adjusted by the structure of the drive ring and acts on the chuck jaws, FIG. 15 shows a top view onto the eccentric of FIG. 14 in the one rotary position, FIG. 16 shows a view corresponding to FIG. 15 in the other rotary position, FIG. 17 shows a view corresponding to FIG. 15 with the eccentric coupled by a drive toothing to the drive ring, FIG. 18 shows a view corresponding to FIG. 17 in the other rotary position, FIG. 19 shows a perspective view of the chuck apparatus according to the invention supplemented by a replacement flange to a rapid replacement device, FIG. 20 shows a view corresponding to FIG. 1 with an air pipe adapter associated with the chuck apparatus, FIG. 21 shows a view corresponding to FIG. 19 with the replacement flange connected to the chuck apparatus as base flange, FIG. 22 shows a view corresponding to FIG. 21 with a free section in sectors, FIG. 23 shows an isolated view of the drive ring with the chuck jaws as well as with the air pipe adapter with carrier ring and coupling member shown in the open position of the rotary position, FIG. 24 shows a view corresponding to FIG. 23 from a different perspective, FIG. 25 shows a view corresponding to FIG. 23 with an alternative coupling member, FIG. 26 shows a view corresponding to FIG. 24 with the coupling member from FIG. 25, FIG. 27 shows a view corresponding to FIG. 23 with yet another coupling member, FIG. 28 shows the detail XXVIII from FIG. 27, FIG. 29 shows a view corresponding to FIG. 27 in the other chucking position, FIG. 30 shows the detail XXX from FIG. 29, FIG. 31 shows a view corresponding to FIG. 27 from another perspective, FIG. 32 shows the detail XXXII from FIG. 31, FIG. 33 shows a view corresponding to FIG. 29 from another perspective, FIG. 34 shows the detail XXXIV from FIG. 33, FIG. 35 shows an exploded view of the replacement flange with the coupling casing; the replacement flange is shown in section, FIG. 36 shows a view corresponding to FIG. 21 with a free section in sectors, FIG. 37 shows the detail XXXVII from FIG. 36 with the rotary position of the air pipe adapter corresponding to the insertion and/or removal of the coupling casing, FIG. 38 shows a view corresponding to FIG. 36 in the chucking position, FIG. 39 shows the detail XXXIV from FIG. 38 in the chucking position, and FIG. 40 shows a perspective view of the chuck apparatus according to the invention with a plurality of alternative workpiece chuck apparatus arranged on replacement flanges.

FIG. 40 shows a rapid replacement system 1 consisting in the exemplary embodiment shown of a chuck apparatus 3 fastened to the working spindle 2 of a tool machine which is not shown itself as a base flange 4 and of several replacement flanges 5 on which different workpiece chuck apparatus 6 can be fastened. The chuck apparatus 3, the replacement flange 5 and the rapid replacement system 1 form independent aspects of the invention which is explained in the following.

FIG. 1 shows the chuck apparatus 3 which is provided for the fastening to the working spindle 2 of a tool machine and has a chuck body 8 comprising a receptacle 7 for the working spindle 2. Furthermore, the chuck apparatus 3 comprises at least two chuck jaws 9 which can be adjusted radially to the body axis and comprises a drive ring 10 for whose rotation in the circumferential direction a drive 11 is provided. In the exemplary embodiments shown in the drawings a total 6 of chuck jaws 9 arranged distributed uniformly over the circumference are provided and the drive 11 is basically formed by a drive wheel 12 which can rotate about a radial axis. However, even other drives 11 are conceivable which are suitable for rotating the drive ring 10. For example, no drive 11 oriented radially to the drive ring 10 is shown to this end in FIG. 6 but rather a spindle drive 13 oriented tangentially to the drive ring 10 in which the spindle casing engages via a drive tooth into a tooth receptacle of the drive ring 10.

As can be recognized in particular from FIG. 5 and FIG. 7 and FIG. 8, the drive ring 10 comprises on its outer circumference for each chuck jaw 9 a structure serving for its adjustment, namely, a control curve 14 formed on the outer circumference and with a control cam 15 serving for the radially outward adjustment of the chuck jaws 9. It is pointed out for the sake of completion that in the case of a radially inward adjusting of the chuck jaws 9 the structure can also be formed on the inner circumference of the drive ring 10.

A drive toothing 16 is constructed on the drive ring 10 on the side facing the working spindle 2 into which toothing the drive wheel 12 engages, whereby a return curve 17 is constructed on the side of the drive ring 10 facing the drive toothing 16 into which curve the chuck jaw 9 engages with a control member 18 (FIG. 8, FIG. 33). FIGS. 14 to 18 show that the adjusting of the chuck jaws 9 does not necessarily have to take place via a control cam 15 in cooperation with a return curve 17 but rather that, for example, the drive ring 10 can also act on an eccentric 44 supported in the chuck body 8 on which eccentric the chuck jaws 9 are supported. The adjustment of the eccentric 44 can take place here according to the FIGS. 15 and 16 via the cooperation of an eccentric cam pin and of a pin receptacle on the drive ring 10 or according to FIGS. 17 and 18 via a toothing.

FIGS. 9 and 10 show an embodiment in which an indicator curve 19 is formed on the outer circumference of the drive ring 10 for cooperating with an indicator pin 20 for displaying the rotary position of the drive ring 20. The indicator pin is preferably arranged in a radial bore of the chuck body 8 so that its position can be recognized optically from the outside; a checking of the radial position of the indicator pin 20 is, however, also possible with a sensor for acting on the control of the tool machine.

FIGS. 11 to 13 show that the chuck jaw 9 has an L-shaped base form on whose base shank 21 the control member 18 is arranged. A pin receptacle 23 open to the drive ring 10 is formed in the second shank 22 into which receptacle a contact pin 24 is inserted which comprises a plane surface 25 on the side associated with the drive ring 10. The contact pin 24 furthermore comprises a pin foot 26 which is secured by a safety ring 27 in the pin receptacle 23. It can be recognized in particular from FIG. 13 that the chuck jaws 9 comprises a groove 28 radially on the outside whose walls 29 are constructed with an inclination so that the groove 28 tapers toward the groove bottom.

As was already explained previously, the chuck apparatus 3 is suitable for forming the base flange 4 of a rapid replacement system 1 which comprises a replacement flange 5 as another constituting component which flange can be chucked with the chuck apparatus 3 as base flange 4. The replacement flange 5 carries the workpiece chuck apparatus 6. The jaws of this workpiece chuck apparatus 6 are adjusted in a customary manner by the air pipe associated with the tool machine so that when the chuck apparatus 3 is used as base flange 4, an air pipe adapter 30 which can rotate at least in a limited manner about the spindle axis is associated with the chuck apparatus 3, the rotation of which adapter can be derived by at least one coupling member 31 from the rotation of the drive ring 10. To this end at least one axially extending adapter groove 32 is formed on the air pipe adapter 30 (FIG. 23) into which groove a sliding block 34 arranged on a carrier ring 33 engages. The coupling member 31 is provided for the rotation of the carrier ring 33, wherein the embodiment shown in FIGS. 23 and 24 shows a drive pinion 35 as coupling member 31 which engages in an outer toothing formed on the carrier ring 33 and into an inner toothing formed on the drive ring 10.

Alternatively, the realizing of the exemplary embodiments shown in the FIGS. 25 and 26 is possible, in which the coupling member 31 is formed by a strut 36 firmly coupling the drive ring 10 and the carrier ring 33.

The embodiment shown in the FIGS. 27 to 30 shows as coupling member 31 a two-arm lever 37 supported on a shaft and whose free lever ends are coupled to the drive ring 10 and to the carrier ring 33. The free end of the two-arm lever 37 associated with the carrier ring 33 engages with a pin into a radially oriented groove while the end associated with the drive ring 10 is forked and extends over a forked cam 38 of the drive ring 10.

Catch cams 39 are formed on the air pipe adapter 30 in the circumferential direction with mutual spacing while countercams 41 are formed on a coupling casing 40 associated with the replacement flange 5 and which are also spaced in the circumferential direction. The spacing is dimensioned in such a manner that upon a starting movement of the replacement flange 5 with the coupling casing 40 taking place in an axial direction, with the one or more catch cams 39 of the base flange 4 can pass between the countercams 41 so that a covering of the one or more catch cams 39 with the countercams 40 takes place upon the rotation of the air pipe adapter 30.

FIG. 35 shows that the replacement flange 5 has a collar 42 from which from which a protrusion 43 projects in a radially inward manner, wherein the walls of the groove 28 or chuck jaws 9 and of the protrusion 43, which walls will make contact, are designed with an inclination in order to generate a downward traction effect.

The functioning of the invention is explained in the following.

Therefore, it is possible to connect the chuck body 8 one time to the working spindle 2 of the tool machine by the screws provided to this end as a replacement for a conventional tightening chuck. The chuck apparatus 3 connected in this manner to the working spindle 2 is already suitable for chucking workpieces or tools, wherein a replacement flange 5 can also be chucked. In order to carry out the chucking, at first the drive wheel 12 is actuated and the drive ring 10 is rotated in such a manner that the chuck jaws 9 are located in the open position, that is, the control cam 15 does not cooperate with the plane surface 25 of the contact pin 24 of the chuck jaws 9. It is ensured at the same time by the coupling member 31 that the carrier ring 33 rotates the air pipe adapter 30 into the open position via the sliding block 34. It is possible in this position to set the replacement flange 5 with this coupling casing 40 axially onto the base flange 4, wherein the countercams 41 of the coupling casing 40 are moved past the catch cam 39 of the air pipe adapter 30. Once this constellation has been reached, the drive wheel 12 is rotated so that the drive ring 10 is rotated out of the open position into the chucking position and the control cam 15 adjusts the chuck jaws 9 radially outward so that they surround with their groove 28 the protrusion 43 formed on the collar 42 of the replacement flange 5. In this radially occurring adjustment of the chuck jaws 9 a downward traction effect is produced due to the inclination of the walls of the groove 28 and of the protrusion 43 and which brings about a defined axial position of the replacement flange 5 opposite the base flange 4.

It should be noted that during the chucking of the replacement flange 5, the rotation of the carrier ring 33 is also already being brought about via the coupling member 31 so that the one or more catch cams 39 which are arranged axially stacked opposite the countercams 41 are rotated with the air pipe adapter 30 and therefore an overlapping of countercams 41 and of catch cams 39 takes place in the manner of a bayonet closure. This completes the connection of the base flange 4 and of the replacement flange 5 and an axial adjustment of the coupling casing 40 can be brought about by the actuation of the air pipe of the tool machine via the air pipe adapter 30 in order to adjust, for example, the chuck jaws of a tightening chuck 6 mounted on the replacement flange 5.

In order to loosen the connection of the replacement flange 5 and of the base flange 4, the drive wheel 12 is merely rotated in the opposite direction so that the drive ring 10 is rotated out of the chucked position into the open position. This brings about on the one hand the rotation of the air pipe adapter 30 so that the one or more catch cams 39 and the countercams 41 no longer overlap. At the same time, the chuck jaws 9 are adjusted radially inward by the control member 18 resting on the return curve 17 so that the groove 28 of the chuck jaw 9 comes out of engagement with the protrusion 43 of the replacement flange 5 with the result that the replacement flange 5 can be axially removed from the base flange 4. It is then possible to fasten another replacement flange 5 with a tightening chuck 6 with different qualities on the base flange 4 and therefore on the tool machine.

LIST OF REFERENCE NUMERALS 1 rapid replacement system
2 working spindle
3 chuck apparatus
4 base flange
5 replacement flange
6 workpiece chuck apparatus
7 receptacle
8 chuck body
9 chuck jaw
10 drive ring
11 drive
12 drive wheel
13 spindle drive
14 control cam
15 control cam
16 drive toothing
17 return curve
18 control member
19 indicator curve
20 indicator pin
21 base shank
22 second shank
23 pin receptacle
24 contact pin
25 plane surface
26 pin foot
27 safety ring
28 groove
29 walls
30 longitudinal pipe adapter
31 coupling member
32 adapter groove
33 drive part
34 sliding block
35 drive part
36 strut
37 lever
38 forked cam
39 catch cam
40 coupling casing
41 countercam
42 collar
43 protrusion
44 eccentric

The invention claimed is:

1. A rapid replacement system comprising: a base flange for operably connecting to a working spindle of a tool machine, with a chuck body comprising a receptacle for the working spindle of a tool machine, a clamping apparatus with a chuck body comprising a receptacle for the working spindle, said clamping apparatus having at least two chuck jaws which can be adjusted radially to a body axis, and a drive ring configured for rotation in the circumferential direction by a drive, comprising a structure is formed on said drive ring on its outer circumference or its inner circumference for each chuck jaw and which serves for its adjusting, a replacement flange which can be clamped by said base flange and can be operably connected to a workpiece clamping apparatus, and an air pipe adapter configured to rotate at least to a limited extent about an axis of said working spindle by at least one coupling member, wherein a rotation of said drive ring can be derived by at least one coupling member from a rotation of said drive ring.

2. The rapid replacement system according to claim 1, comprising said structure of said drive ring is formed by a control curve located on the outer circumference and with a control cam serving to adjust each of said at least two chuck jaws in a radially outward manner.

3. The rapid replacement system according to claim 1, comprising said drive is formed by a drive wheel which can rotate about a radial access and which engages into a drive toothing formed on said drive ring, and that a return curve is formed on the side of said drive ring facing said drive toothing into which curve the chuck jaw engages with a control member.

4. A rapid replacement system according to claim 3, comprising an indicator curve is formed on the outer circumference of said drive ring for cooperating with an indicator pin for displaying a rotary position of said drive ring.

5. The rapid replacement system according claim 1, wherein said chuck jaw comprises a groove on an outside radial.

6. A rapid replacement system according to claim 5, further comprising a replacement flange for forming a connection to said chuck apparatus comprising a collar formed with a radially inward protrusion projecting from said collar.

7. A rapid replacement system according to claim 5, wherein said replacement flange further comprising a coupling casing is provided on which countercams are formed in the circumferential direction with a mutual spacing and whose spacing is dimensioned in such a manner that upon a starting movement taking place in an axial direction on one or more catch cams of a base flange can pass between the countercams.

8. A rapid replacement system according to claim 5, wherein said replacement flange further comprising a wall of said protrusion is configured with an incline in order to produce a downward traction effect.

9. A rapid replacement system according to claim 1, further comprising at least one axially extending adapter groove is formed on said air pipe adapter into which said groove engages a sliding block arranged on a carrier ring, and that said coupling member is provided for a rotation of said carrier ring.

10. A rapid replacement system according to claim 9, wherein said carrier ring comprises an outer toothing and said drive ring comprises an inner toothing into which a drive pinion engages said coupling member.

11. A rapid replacement system according to claim 9, wherein said coupling member is formed by a strut rigidly coupling said drive ring and said carrier ring.

12. A rapid replacement system according to claim 9, wherein said coupling member is formed as a two-arm lever supported on a shaft and whose free lever ends are coupled to said drive ring and to said carrier ring.

13. A rapid replacement system according to claim 1, further comprising one or more catch cams are formed on said air pipe adapter in the circumferential direction with a mutual distance.

14. The rapid replacement system according to claim 1, comprising said chuck jaw has an L-shaped base form comprising a base shank and a control member disposed thereon, and a pin receptacle open to said drive ring is formed in a second shank into which a contact pin is inserted in said receptacle.

15. The rapid replacement system according to claim 14, comprising the contact pin has a plane surface on the side facing said drive ring and said contact pin comprises a pin foot for operably connecting in said pin receptacle.

16. A rapid replacement system, comprising: a base flange for operably connecting to a working spindle of a tool machine, a chuck apparatus with a chuck body comprising a receptacle for said working spindle, said chuck apparatus having at least two chuck jaws which can be adjusted radially to a body axis, said chuck jaw has an L-shaped base comprising a base shank and a control member is arranged thereon, and a pin receptacle open to a drive ring formed in a second shank into which a contact pin is inserted in said pin receptacle, wherein said drive ring is configured for rotation in the circumferential direction by a drive, and a structure formed on said drive ring on its outer circumference or its inner circumference for each chuck jaw configured for adjusting said drive ring.

17. A rapid replacement system comprising: a base flange for operably connecting to a working spindle of a tool machine, a chuck apparatus with a chuck body comprising a receptacle for said working spindle, said chuck apparatus having at least two chuck jaws which can be adjusted radially to a body axis, said chuck jaw has an L-shaped base comprising a base shank and a control member is arranged thereon, and a pin receptacle open to a drive ring formed in a second shank into which a contact pin (is inserted in said pin receptacle, said contact pin has a plane surface on a side facing said drive ring and said contact pin further comprises a pin foot for operably connecting in said pin receptacle, wherein said drive ring is configured for rotation in the circumferential direction by a drive, and a structure formed on said drive ring on its outer circumference or its inner circumference for each chuck jaw configured for adjusting said drive ring.

* * * * *